Oct. 16, 1956  A. N. STANTON  2,766,652
DEVICE FOR DETERMINING THE DEGREE OF ROTATION OF POLARIZED LIGHT
Filed Dec. 3, 1951  3 Sheets-Sheet 1
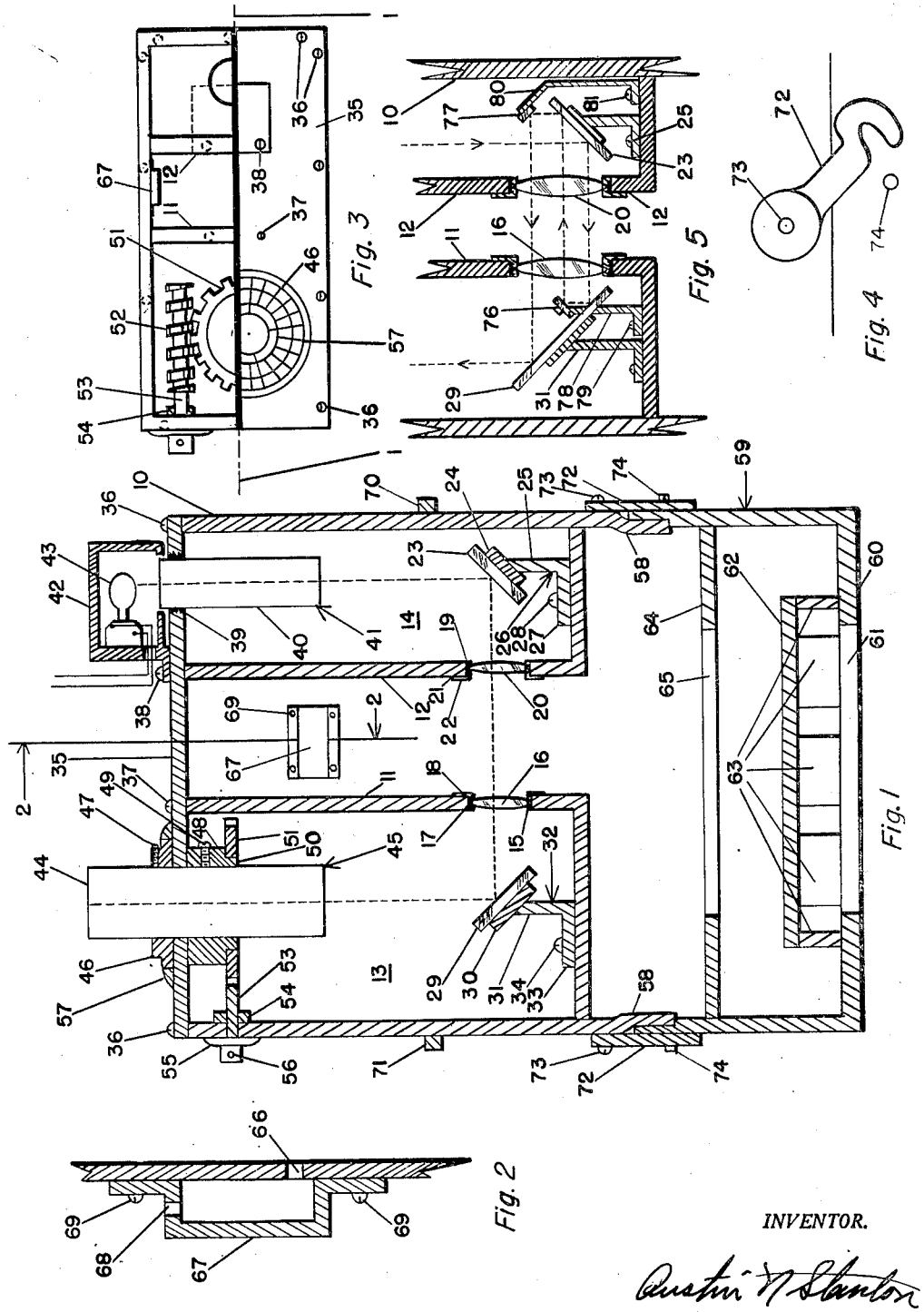
INVENTOR.
Austin N. Stanton

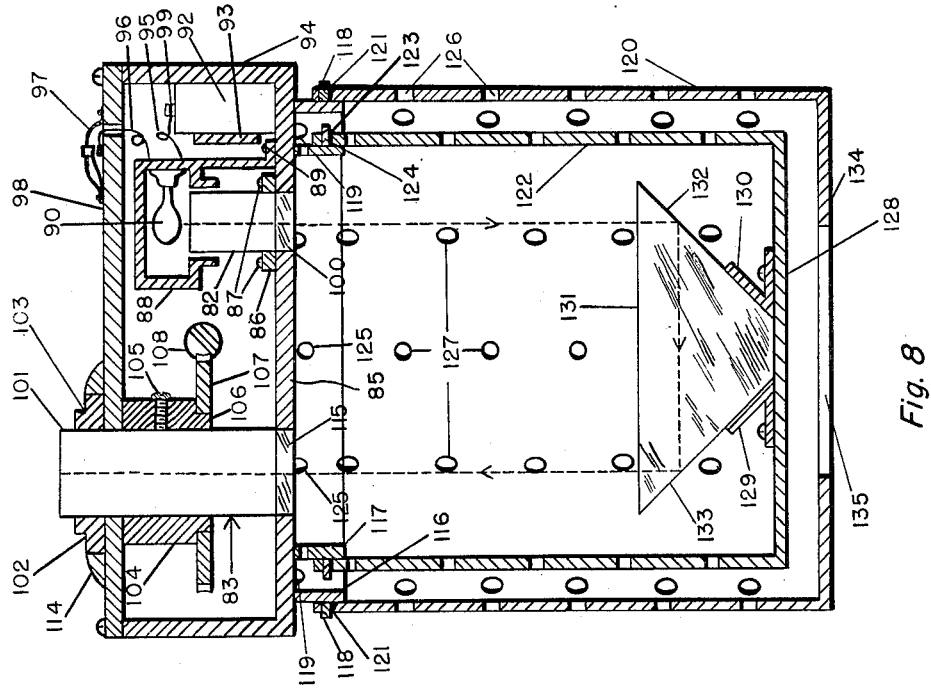
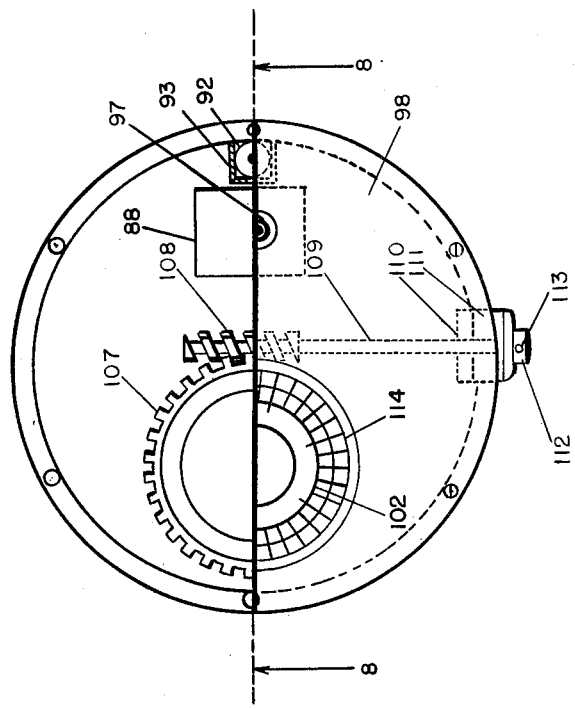

Oct. 16, 1956 A. N. STANTON 2,766,652
DEVICE FOR DETERMINING THE DEGREE OF ROTATION OF POLARIZED LIGHT
Filed Dec. 3, 1951 3 Sheets-Sheet 3
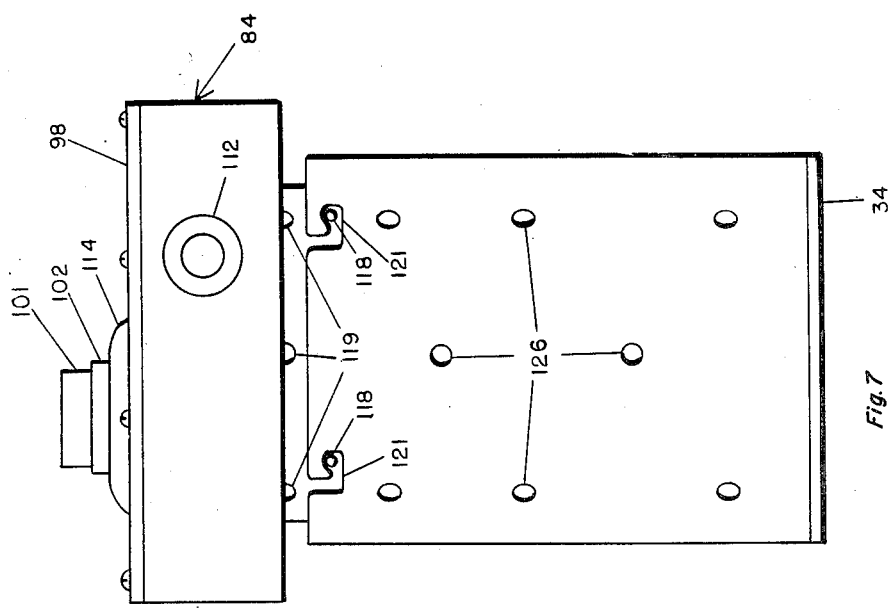
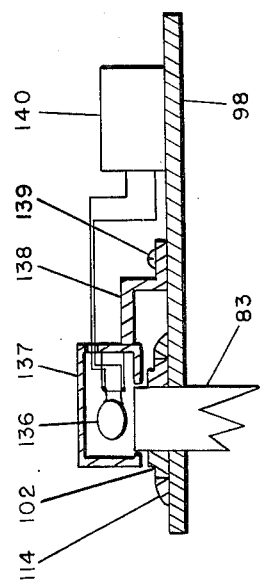
INVENTOR.
Austin N Stanton United States Patent Office 2,766,652
Patented Oct. 16, 1956

2,766,652

DEVICE FOR DETERMINING THE DEGREE OF ROTATION OF POLARIZED LIGHT

Austin N. Stanton, Garland, Tex.

Application December 3, 1951, Serial No. 259,670

11 Claims. (Cl. 88—14)

This invention relates to devices for determining the degree of rotation of polarized light passed through a solution and more particularly to such a device which may be immersed in the solution.

Certain solutions, e. g., ordinary cane sugar, possess the property of rotating the plane of vibration of polarized light. The degree of rotation of the plane of vibration per unit distance of the solution traversed by the polarized light varies in accordance with the strength of the solution. Devices for determining the strength of solution which employ a light polarizer, an analyzer to determine degree of rotation of the plane of vibration of light passing through a solution, and a liquid tight tube provided with transparent ends interposed between the polarizer and the analyzer are well known in the art. The portion or sample of the solution to be tested must be removed from its vat or other container and placed in the tube. After the solution has been tested the tube must be emptied and washed thoroughly to prevent an erroneous result in a succeeding test in which the same tube is employed. Since the tubes are relatively long and narrow, the filling and washing of the tubes is time consuming. It is desirable to provide a testing device to determine the degree of rotation of the plane of vibration of polarized light by a device which can be immersed in the solution in the vat or container which contains the solution in order to obviate the taking and testing of a sample portion of the solution.

Accordingly, it is an object of my invention to provide a new and improved device for determining the degree of rotation of the plane of vibration of polarized light.

It is another object of my invention to provide a new and improved device for testing the strength of solutions by determining the degree of rotation of the plane of vibration of polarized light passed through the solutions.

It is still another object of my invention to provide a new and improved device for testing the strength of solutions by immersing the device into the solutions to determine the degree of rotation of the plane of vibration of polarized light passed through the solution.

Briefly stated, my new and improved device for the testing of the strength of solutions comprises a housing having a pair of spaced compartments. Each of the compartments is provided with a transparent window. The windows of the two compartments face each other. One of the compartments houses a polarizer and a first mirror which reflects the polarized light transmitted by the polarizer through the windows of the compartments. The other compartment houses an analyzer and a second mirror which reflects the light received from the first mirror into the analyzer. A vernier mechanism is provided on the housing to rotate the analyzer and a light source is mounted on the housing to project light into the polarizer. The open lower end of the housing is provided with a substantially light proof closure which, however, permits fluids to enter the space between the windows of the compartment. The housing is lowered into the solution so that the solution fills the space between the windows.

The polarized light passing through the solution between the windows has its plane of vibration rotated by the solution. The degree of rotation is determined by rotating the analyzer as in conventional saccharimeters.

In another embodiment of my invention, a plurality of mirrors is provided in each compartment to reflect the polarized light several times through the solution between the windows of the compartments. A greater degree of rotation is obtained by this latter embodiment for a solution of a given strength due to the greater distance the polarized light must traverse through the solution before it is reflected into the analyzer.

For a better understanding of my invention reference may be had to the following description taken in connection with the accompanying drawing and its scope will be pointed out in the appended claims.

In the drawing, Figure 1 is a cross sectional view of a preferred embodiment of my invention;

Figure 2 is a fragmentary sectional view taken along line 2—2 of Figure 1;

Figure 3 is a top plan view of the device illustrated in Figure 1 with a portion broken away;

Figure 4 is a fragmentary plan view of a part of the device illustrated in Figure 1;

Figure 5 is a fragmentary cross-sectional view of a modified form of the device illustrated in Figure 1;

Figure 6 is a top plan view of another modified form of the device of my invention with a portion broken away;

Figure 7 is a side elevational view of the device of Figure 6;

Figure 8 is a sectional view of the device of Figure 6; and,

Figure 9 is a fragmentary sectional view of still another modified form of my invention.

Referring now to Figures 1, 2 and 3 of the drawing, the illustrated preferred embodiment of my invention comprises a rectangular housing 10 having a pair of L-shaped members 11 and 12, each of which is rigidly secured, as by welding, to three sides of housing 10 to form two compartments 13 and 14 which are located at opposite ends of housing 10.

Member 11 is provided with a threaded aperture which receives a flanged and exteriorly threaded ring 15 in which is secured, by cement or other adhesive, a glass lens 16. An annular gasket 17 is interposed between the annular flange 18 of ring 15 and the outer surface of member 11 to make a liquid tight seal.

Member 12 is provided with a threaded aperture which receives a flanged and exteriorly threaded ring 19 in which is secured, by cement or other adhesive, a glass lens 20. An annular gasket 21 is interposed between the annular flange 22 of ring 19 and the outer surface of member 12 to make a watertight seal. Lenses 16 and 20 are alined so that light may be passed from compartment 14 to compartment 13 through lenses 20 and 16.

A mirror 23 is secured by an adhesive to a plate 24 which is mounted on the upper end of the vertical leg 25 of a bracket 26 which has a horizontal leg 27 secured to housing 12 by a screw 28 or by any other conventional means. Mirror 23 is so inclined that it reflects vertical rays of light through lenses 20 and 16. A similar mirror 29 is mounted in compartment 13. Mirror 29 is secured by an adhesive to a plate 30 which is mounted on the end of the vertical leg 31 of a bracket 32 which has a horizontal leg 33 secured to housing 11 by a screw 34 or by any other conventional means. Mirror 29 is inclined to reflect the horizontal light rays it receives from lens 16 in an upward vertical direction.

A cover plate 35 covers housing 10 and closes compartment 13 and 14. Cover plate 35 is secured to housing 10 by means of screws 36, to member 11 by screws 37, and to member 12 by screws 38. Cover plate 35 is provided with a threaded aperture located directly above mirror 23 in which is engaged the threaded portion 39 of polarizer sleeve 40 of light polarizer 41. A hood 42 is also mounted on cover plate 35 by means of two of the screws 38. In hood 42 is mounted a light bulb 43 which may be energized from any suitable source of current, not shown. A dry cell could be mounted on plate 35 to energize bulb 43 if it were so desired. Bulb 43 is positioned directly above polarizer 41 and projects unpolarized light into the polarizer 41. The polarizer 41, which may comprise a conventional Nicol prism or a Polaroid plate mounted in sleeve 40, polarizes the light emitted by bulb 43 and projects a beam of polarized light on mirror 23.

Cover plate 35 is also provided with an aperture through which passes the sleeve 44 of an analyzer 45. A graduated ring 46 is disposed above cover plate 35 and is rigidly secured to sleeve 44 by means of a set screw 47. A sleeve 48 is rigidly secured, below plate 35, to sleeve 44 by means of a set screw 49. It will be apparent that ring 46 and sleeve 48 prevent vertical movement of sleeve 44 relative to cover plate 35. Sleeve 48 has a reduced lower portion 50 on which is press fitted a gear 51 which meshes with a worm gear 52. The shaft 53 of the worm gear is provided with an annular flange 54 which abuts the inner surface of housing 10. The shaft 53 extends through a suitable aperture in housing 10 and into a cap 55 which is rigidly secured to shaft 53 by means of a set screw 56. A graduated ring 57 is rigidly secured to cover plate 35 and is positioned about graduated ring 46, the two rings 46 and 57 constituting a conventional vernier arrangement for measuring the degree of rotation of analyzer 45.

Analyzer 45 comprises a conventional Nicol prism or Polaroid plate mounted in sleeve 44. The polarized beam as reflected by mirror 29 passes through polarizer 45 which is mounted directly above mirror 29.

The lower end of housing 10 is reduced as at 58 to fit into a light trap 59 which has a bottom 60 provided with an aperture 61. Spaced above aperture 61 is a plate 62 which is secured to bottom 60 by means of a plurality of legs 63. A rectangular apertured plate 64 having an aperture 65 is secured to the vertical walls of light trap 59. Legs 63 may be secured to bottom 60 and plate 64 may be secured to the walls of trap 59 by welding, soldering or any other conventional means. Plate 62 is of greater dimensions than apertures 61 and 65 so that light may not enter directly from aperture 61 to aperture 65. All surfaces of light trap 59 as well as the surfaces of housing 10, member 10 and 11 and cover plate 35 are black in color in order to prevent reflection of light from these surfaces so that the only light passing through the interior of the device is the light polarized by polarizer 41.

The housing 10 is provided with one or more apertures 66 adjacent its upper edge. In order to minimize the amount of light entering into the interior of the device through apertures 66, a light shield 67 is secured to housing 10 over each of the apertures 66. The light shield 67 may be a boxlike structure having its open end registering with the aperture 66 and having an upper side provided with a plurality of narrow apertures 68. The shield 67 may be secured to housing 11 by means of screws 69. Light shield 67 is black in color to prevent reflection of light.

In operation, bulb 43 is lighted and knob 55 is turned to rotate analyzer 45 until no, or a minimum amount of, light reaches the eye at the analyzer 45. The device is then immersed in the solution to be tested, the solution entering into the device through apertures 61 and 65. The air which would otherwise be trapped in the device escapes through apertures 66. The device is immersed to a level which ensures that the space between lenses 16 and 20 is filled with the solution. A pair of plates 70 and 71 may be secured to housing 10 to indicate the level to which the device should be immersed in the solution. With the solution between lenses 16 and 20, the solution rotates the plane of vibration of the light passing through the solution so that light now reaches the eye at analyzer 45. Knob 55 is then turned until no, or a minimum amount of light reaches the eye at analyzer 45. The original and final positions of the analyzer, i. e., the angle through which the analyzer has been rotated, indicate the amount of rotation of the plane of vibration of the polarized light passing through lenses 16 and 20. Light trap 59 is employed to prevent extraneous light from passing from the main body of the solution into analyzer 45. Extraneous light which reaches analyzer 45 renders more difficult the perception of the point at which the minimum amount of light reaches the eye at the analyzer. Light trap 59 may be secured to housing 10 by means of latches 72 pivotally attached to housing 10 at 73 which are adapted to engage outwardly extending lugs 74 on light trap 59. Since light trap 59 is detachable the device may be easily cleaned after use.

The degree of rotation of the plane of vibration of polarized light varies in accordance not only with the strength of the solution but also with the distance the polarized light must travel through the solution. In order to increase the sensitivity of device to measure very small variations in the strengths of solutions without increasing the dimensions of the device, additional mirrors 76 and 77 may be mounted in compartments 13 and 14, respectively, to cause the polarized light to travel several times through the solution between lenses 16 and 20. Mirror 76 may be mounted on a bracket 78 secured to member 11 by means of screws 79 while mirror 77 may be mounted on a bracket 80 secured to member 12 by means of screws 81.

The beam of polarized light from polarizer 41 impinges on mirror 23 and is reflected to travel through lens 20, the solution, lens 16 and then impinges on mirror 29. It is there reflected by mirror 29 to impinge on mirror 76 and is reflected to travel again through lens 16, the solution, lens 20 and then impinge again on mirror 23. From mirror 23 the beam is reflected to impinge on mirror 77 and is there reflected to travel again through lens 20, the solution, and lens 16 to impinge on mirror 29 and be reflected to analyzer 45. It will be noted that in this modification of the device, the polarized light travels three times through the solution so that, everything else being unchanged, the plane of vibration of the polarized light will be rotated three times as much as it would be if mirrors 76 and 77 were not employed. A very small change in the strength of the solution will therefore produce a relatively large change in the degree of rotation of the plane of vibration; thus increasing the sensitivity of the instrument.

Figures 6, 7 and 8 illustrate another embodiment of my device for determining the degree of rotation of polarized light passed through a solution in which the polarizer 82 and an anlyzer 83 are mounted in a receptacle or housing 84. The polarizer 82 is secured to the bottom 85 of housing 84 by means of an annular flange 86 which is rigidly secured to the bottom 85 of housing 84 by means of screws 87. Flange 86 may be rigidly secured around the lower end of polarizer 82 by an adhesive or in any other conventional manner. A hood 88 is mounted on bottom 85 by means of screws 89. In hood 88 is mounted a lamp 90 which may be energized from a dry cell 92 secured to housing 84 by a bank 93 whose ends are secured to the cylindrical wall 94 of housing 84 by soldering or an any other conventional manner. The bulb 90 is connected to dry cell 91 through conductors 95 and 96 and a switch 97 mounted on the cover 98 of housing 84. The positive terminal 99 of dry cell 92 may be connected to one side of lamp 90 by conductor 95 while the negative side of the dry cell, the outer shell, may be connected to the other side of lamp 90 through wall 94, cover 98, switch 97 and conductor 96. It will be apparent that lamp 90 may be energized from an outside source of current if it be so desired.

Lamp 90 is positioned directly above polarizer 82 and projects unpolarized light into polarizer 82. The polarizer 82 which may comprise a conventional Nicol prism or a polaroid plate, polarizes the light emitted by lamp 90 and projects a beam of light through a window 100 in bottom 85. Window 100 may be cemented in a suitable aperture in bottom 85 in watertight relationship thereto.

Cover 98 is provided with an aperture through which passes the sleeve 101 of analyzer 83. A graduated ring 102 is rigidly secured above cover 98 to sleeve 101 by means of a set screw 103. A sleeve 104 is rigidly secured to sleeve 101 below cover 98 by means of a set screw 105. Sleeve 104 has a reduced lower portion 106 on which is press fitted a gear 107 which meshes with a worm gear 108. The shaft 109 of worm gear 108 is provided with an annular flange 110 which abuts an abutment 111 provided on the inner surface of wall 94. The knob 112 is secured to the shaft 109 by a set screw 113. A graduated ring 114 is rigidly secured to cover 98 and is positioned about graduated ring 102, the two rings 102 and 114 constituting a conventional vernier arrangement for measuring the degree of rotation of analyzer 83.

Analyzer 83 comprises a conventional Nicol prism or Polaroid plate mounted in sleeve 101 and is positioned directly above a window 15 in bottom 85. Window 115 may be cemented in a suitable aperture in bottom 85 in watertight relation thereto.

Bottom 85 is provided with a pair of spaced concentric downwardly dependent rings 116 and 117 which rigidly secured to bottom 85. Ring 116 is provided with a plurality of outwardly extending lugs 118 and a plurality of apertures 119 adjacent bottom 85. An outer cylindrical sleeve 120 provided with a plurality of slots 121 in its upper rim is detachably secured to ring 116 by means of the lugs 118 which engage in slots 121. An inner cylindrical sleeve 122 is provided with a plurality of slots 123, similar to slots 121 of sleeve 120, which engage the outwardly extending lugs 124 of ring 117. Ring 117 is also provided with a plurality of slots 125 in its upper rim.

Sleeve 120 is of greater length and diameter than sleeve 122 and is telescoped over sleeve 122. In order to permit the solution to enter into the interior of sleeve 122, sleeves 120 and 122 have been provided with a plurality of apertures 126 and 127, respectively. Apertures 126 and 127 are so positioned in sleeves 120 and 122 that they are out of registry so that substantially no light will enter into the interior of sleeve 122 through apertures 126 and 127. Apertures 119 and 125 of rings 116 and 125 are similarly positioned out of registry to prevent passage of light into the interior of sleeve 122 through apertures 119 and 125.

Rigidly secured to the bottom 128 of sleeve 127 by means of brackets 129 and 130 is a prism 131. Prism 131 may be rigidly secured to brackets 129 and 130 by a cement or other suitable adhesive. Prism 131 is disposed directly beneath polarizer 82 and analyzer 83 so that the beam of polarized light from polarizer 82 is reflected by side 132 of prism 131 to side 133 and thence into analyzer 83. The bottom 134 of sleeve 120 is provided with a central aperture 135 which is of smaller diameter than bottom 128 of sleeve 122.

In operation, the sleeves 120 and 122 are secured to rings 116 and 117, respectively, and the device is then immersed in the solution to a level slightly above bottom 85 of housing 84. The solution will enter into the interior of sleeve 122 through apertures 135, 126 and 127. The apertures 119 and 125 of rings 116 and 117, respectively, prevent the formation of air pockets beneath bottom 85 and within rings 116 and 117 by allowing the air to escape from beneath bottom 85. All apertures in sleeves 120 and 122, and in ring 116 and 117 not registering with each other, little or no light enters into the interior of sleeve 122 through these apertures. All components of the device are preferably black to prevent the passage of light, other than that emitted by lamp 90, into the interior of sleeve 122. The degree of rotation of the plane of vibration of the polarized light in passing through the solution within sleeve 122 is determined as described above in connection with the description of the embodiment illustrated in Figures 1 to 5.

In the above embodiments of the invention, the amount of light at the upper end of analyzer 45 or 83, as the case may be, is gaged by the eye of the operator. If desired, the amount of light at the upper end of analyzer, e. g. analyzer 83, may be determined by the use of a photocell 136 which is mounted in a hood 137 which is mounted over analyzer 83 by means of a bracket 138 secured to cover by means of screws 139. Hood 137 prevents extraneous light from falling upon photocell 136. The photocell may be connected to any suitable indicating device such as a galvanometer 140. The method of operation of the photocell 136, which may be of the type which produces a potential which varies in accordance with the intensity of the light falling upon it, will be apparent to those skilled in the art. The switch 97 may be actuated to light lamp 90 and the analyzer 83 may be rotated by turning knob 113 to a position where the galvanometer gives either a minimum or a maximum reading as may be preferred. Then the device is submerged in the solution to a level in which the solution reaches windows 115 and 100. The knob 113 is then turned to a position in which the galvanometer gives either a minimum or a maximum reading as the case may be. The difference in the positions of analyzer 83, as determined by graduated rings 102 and 114, for either two minimum or two maximum readings of the galvanometer 140 indicates the strength of the solution tested.

While I have illustrated and described particular embodiment of my invention it will be obvious that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a device for measuring the degree of rotation of the plane of vibration of polarized light by a solution: a housing having a pair of compartments, each of said compartments having a window in one wall thereof, said windows being spaced from and facing one another; an inclined mirror in each of said compartments; a polarizer positioned above one of said mirrors for transmitting a beam of polarized light to said one of said mirrors; and an analyzer positioned above the other of said mirrors, said beam of polarized light being reflected by said one of said mirrors to the other of said mirrors through said windows, said other of said mirrors reflecting said beam into said analyzer, said housing being immersible in said solution to a level above said windows.

2. In a device for measuring the degree of rotation by a solution of the plane of vibration of polarized light: a housing having an open bottom and a pair of spaced compartments each of said compartments having a window in one wall thereof, said windows being spaced from and facing one another; an inclined mirror in each of said compartments; means positioned above one of said mirrors for transmitting a beam of polarized light to said one of said mirrors, and means positioned above the other of said mirrors for measuring the degree of rotation of the plane of vibration of polarized light, said beam of polarized light being reflected by said one of said mirrors through said windows, said housing being immersible in said solution to a level above said windows.

3. In the device of claim 2, a light trap secured to said housing and closing said open bottom to prevent the passage of light into said housing but allowing passage of said solution thereinto.

4. In a device for measuring the degree of rotation by a solution of the plane of vibration of polarized light: a housing having an open bottom and a pair of spaced compartments, each of said compartments having a window in one wall thereof, said windows being spaced from and facing one another; a mirror in each of said compartments; a source of light positioned above one of said mirrors; means interposed between said source of light and said one of said mirrors for transmitting a beam of polarized light to said one of said mirrors; means positioned above the other of said mirrors for measuring the degree of rotation of the plane of vibration of polarized light, said beam of polarized light being reflected by said one of said mirrors to the other of said mirrors through said windows, said housing being immersible in said solution to a level above said windows.

5. In a device for measuring the degree of rotation of the plane of vibration of polarized light by a solution: a housing having an open bottom and a pair of spaced compartments, each of said compartments having a window in one wall thereof, said windows being spaced from and facing one another; a plurality of mirrors in each of said compartments; a source of light positioned above one of said mirrors; means interposed between said source of light and said one of said mirrors for transmitting a beam of polarized light to one of said mirrors in one of said compartments for transmitting a beam of polarized light to said one of said mirrors in said one of said compartments; and means positioned above one of said mirrors in the other of said compartments for measuring the degree of rotation of the plane of polarization of polarized light reflected to said means by said one of said mirrors in the other of said compartments, said housing being immersible in said solution to a level above said windows, said beam of polarized light being reflected several times by said mirrors through the solution between said windows before being reflected to said means for detecting rotation of the plane of vibration of polarized light.

6. In a device for measuring the degree of rotation of the plane of vibration of polarized light by a solution: a housing having a pair of windows spaced from and facing one another; a pair of mirrors, one of said mirrors being disposed adjacent one of said windows and the other of said mirrors being disposed adjacent the other of said windows; means positioned above one of said mirrors for transmitting a beam of polarized light to said one of said mirrors; and means positioned above the other of said mirrors for measuring the degree of rotation of the plane of vibration of polarized light, said housing being immersible in said solution to a level above said windows, said beam of polarized light being reflected by said one of said mirrors to the other of said mirrors through said windows and the solution between said windows, said other of said mirrors reflecting said beam to said means for detecting the plane of vibration of polarized light.

7. In a device for measuring the degree of rotation of the plane of vibration of polarized light by a solution: a housing having a pair of windows spaced from and facing one another, said housing being immersible in a solution to a level above said windows; means for projecting a beam of polarized light through said windows and said solution between said windows; a mirror adjacent one of said windows; and means positioned above said mirror for measuring the degree of rotation of the plane of vibration of the polarized light projected through said windows in passing through the solution, said light being reflected by said mirror into said last mentioned means.

8. In a device for measuring the degree of rotation of the plane of vibration of polarized light by a solution: a housing having a central aperture; a pair of windows fixed to said housing on opposite sides of said central aperture, said housing being immersible in a solution to a level above said windows; means for projecting a beam of polarized light through said windows and said solution between said windows; a mirror adjacent one of said windows; and means positioned above said mirror for measuring the degree of rotation of the plane of vibration of the polarized light projected through said windows in passing through the solution, said light being reflected by said mirror into said last mentioned means.

9. In a device for measuring the degree of rotation of the plane of vibration of polarized light by a solution: a housing having a central aperture and an open bottom; a pair of windows fixed to said housing on opposite sides of said central aperture, said housing being immersible in a solution to a level above said windows; means for projecting a beam of polarized light through said windows and said solution between said windows; a mirror adjacent one of said windows; means positioned above said mirror for measuring the degree of rotation of the plane of vibration of the polarized light projected through said windows in passing through the solution, said light being reflected by said mirror into said last mentioned means; and a light trap secured to said housing and closing said open bottom to prevent the passage of light into said central aperture but allowing passage of said solution thereinto.

10. In a device for measuring the degree of rotation of the plane of vibration of polarized light by a solution: a housing having a central aperture; a pair of windows fixed to said housing on opposite sides of said central aperture, said housing being immersible in a solution to a level above said windows; means secured to said housing for producing a beam of polarized light; a plurality of mirrors secured to said housing for passing said beam of polarized light several times through said solution between said windows; and means positioned above one of said mirrors for measuring the degree of rotation of the plane of vibration of said polarized light in passing through said solution between said windows, said light being reflected by said one of said mirrors into said last mentioned means.

11. In a device for measuring the degree of rotation of the plane of vibration of polarized light by a solution: a housing having a central aperture and an open bottom; a pair of windows fixed to said housing on opposite sides of said central aperture, said housing being immersible in a solution to a level above said windows; means secured to said housing for producing a beam of polarized light; a plurality of mirrors secured to said housing for passing said beam of polarized light several times through said solution between said windows; means positioned above one of said mirrors for measuring the degree of rotation of the plane of vibration of said polarized light in passing through said solution between said windows, said light being reflected by one of said mirrors into said last mentioned means; and a light trap secured to said housing and closing said open bottom to prevent the passage of light into said central aperture but allowing passage of said solution thereinto.

References Cited in the file of this patent

UNITED STATES PATENTS

| | | |
|---|---|---|
| 1,746,616 | Sounitza | Feb. 11, 1930 |
| 1,848,874 | FitzGerald | Mar. 8, 1932 |
| 2,203,720 | Dale | June 11, 1940 |
| 2,324,304 | Katzman | July 13, 1943 |
| 2,427,013 | MacAdams | Sept. 9, 1947 |
| 2,580,500 | Albert | Jan. 1, 1952 |

FOREIGN PATENTS

| | | |
|---|---|---|
| 23,617 | France | July 19, 1921 |
| (1st addition to No. 501,330) | | |
| 724,224 | Germany | Aug. 20, 1942 |